United States Patent [19]

Verleur

[11] 3,853,643

[45] Dec. 10, 1974

[54] EPITAXIAL GROWTH OF GROUP III-V SEMICONDUCTORS FROM SOLUTION

[75] Inventor: Hans Willem Verleur, Reading, Pa.

[73] Assignee: Bell Telephone Laboratories, Incorporated, Murray Hill, N.J.

[22] Filed: June 18, 1973

[21] Appl. No.: 370,947

[52] U.S. Cl. .................. 148/171, 148/172, 148/173, 148/1.5, 118/415, 252/62.3 GA, 252/62.3 GA

[51] Int. Cl. .................. H01l 7/38

[58] Field of Search .................. 148/171–173; 118/415

[56] References Cited

UNITED STATES PATENTS

| | | | |
|---|---|---|---|
| 3,631,836 | 1/1972 | Jarvela et al. | 118/415 |
| 3,664,294 | 5/1972 | Solomon | 148/415 X |
| 3,665,888 | 5/1972 | Bergh et al. | 118/415 X |
| 3,690,964 | 9/1972 | Saul | 148/171 |
| 3,690,965 | 9/1972 | Bergh et al. | 148/172 |

*Primary Examiner*—G. Ozaki
*Attorney, Agent, or Firm*—A. N. Friedman; G. S. Indig

[57] ABSTRACT

Epitaxial layers of Group III-V compound semiconductors are grown from solution, simultaneously on several substrate wafers. The solution is produced in bulk at an elevated temperature. The mass of solution is sectioned into small portions and each portion brought into contact with one substrate wafer by displacing one set of carrier plates relative to an interleaved set of carrier plates. Each portion is constrained to form an essentially uniform layer of the order of one millimeter in thickness over the growth face of the substrate wafer. Epitaxial growth is accomplished by reducing the temperature of the assembly.

14 Claims, 2 Drawing Figures

EPITAXIAL GROWTH OF GROUP III-V SEMICONDUCTORS FROM SOLUTION

BACKGROUND OF THE INVENTION

1. Field of the Invention

The invention concerns the simultaneous growth of epitaxial crystalline layers of Group III-V compound semiconductors on several substrates from thin layers of nutrient solution.

2. Description of the Prior Art

The liquid phase epitaxy method for growing a layer of a semiconductor material on a crystalline substrate has been shown to be useful for the fabrication of devices using Group III-V compound semiconductors (i.e., the Group III-V compound semiconductors and their ternary combinations). This method has come into wide spread use in conjunction with the GaAs-GaP materials in which thereis increasing commercial interest (*RCA Review*, 24 (1963) 603; *Journal of Applied Physics*, 39 (1968) 2747). The method, basically, involves the formation of a saturated solution of the compound semiconductor in an additional quantity of its Group III constituent, bringing the saturated solution into contact with the substrate and reducing the temperature of the solution and substrate in order to cause deposition onto the substrate of the dissolved semiconductor material and such other species as are included as dopants.

A number of methods have been employed in bringing the solution into contact with the substrate. The above two references uutilize what has become known as the tipping method. In this method the solution is contained in one section of the growth boat and the substrate held in another section. After the temperature has been raised to an initial temperature the growth boat is tipped and the solution flows to the other end covering the substrate. A method involving the 360° rotation of the growth boat is disclosed by Donahue (*Journal of Crystal Growth*, 7 (1970) 221). In this reference Donahue also discloses some of the advantages of restricting the thickness of the solution layer in contact with the substrate. He states, however, that he was not able to get the solution to flow into a space less than about 3 millimeters wide. Teaching the advantages of growing epitaxial semiconductor layers from solution layers 3 millimeters thick or less, Bergh, et al., (U.S. Pat. No. 3,690,965, issued Sept. 12, 1972) solve the problem of bringing a thin layer of solution into contact with the substrate by using a system of sliders in order to slice off an aliquot of solution from a solution reservoir. In the exemplary Bergh apparatus the simultaneous growth of crystalline layers on several substrates requires the sequential slicing off of aliquots at each reservoir aperture. This requirement imposes some limitations on the compactness of the growth apparatus, thus, some limitations on the device output of a furnace of given size.

SUMMARY OF THE INVENTION

A method has been developed which enables the simultaneous deposition from solution of epitaxial crystal layers on a plurality of III-V semiconductor substrates, each of which is contacted with a solution layer of the order of 1 millimeter thick over the growth face.

In the inventive method a mass of epitaxial growth solution is formed in bulk in the growth apparatus by raising the solvent and solutes to an elevated temperature. The solution mass is simultaneously sectioned into at least as many portions as there are layers to be grown and each substrate wafer brought into contact with a portion of solution.

Each wafer is held in a carrier plate. The sectioning is produced by displacing one set of carrier plates relative to another, interleaved set of carrier plates. This displacement also brings each wafer into contact with a portion of solution. Each portion is constrained in the direction perpendicular to the growth face of the substrate wafer to form an essentially uniform layer of the order of one millimeter in thickness. Epitaxial growth is produced by lowering the temperature of the assembly.

DETAILED DESCRIPTION OF THE INVENTION

The Apparatus

Figure 1:
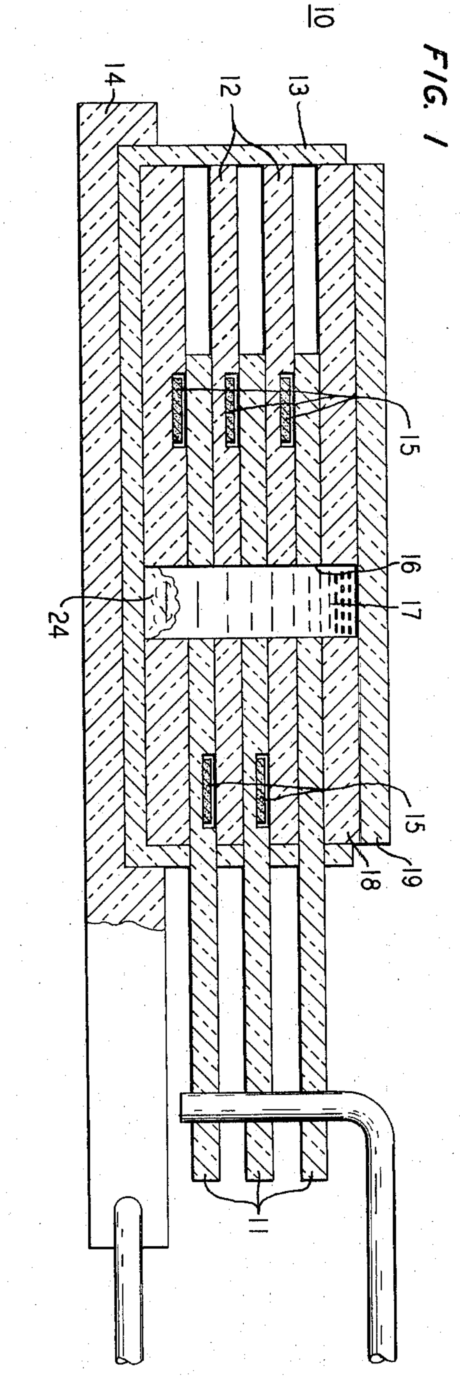
FIG. 1 is an elevational view in section of an exemplary epitaxial crystal growth apparatus, showing the growth solution in bulk.

FIG. 1 shows an exemplary apparatus which has been adapted for epitaxial crystal growth according to the inventive method. In this apparatus 10 a set of movable carrier plates 11 is interleaved with a set of stationary carrier plates 12. The carrier plates are held in a supporting boat 13 and cradle 14. Each carrier plate 11, 12 has a depression containing a substrate wafer 15 and a hole 16. As shown, the holes are aligned to form a reservoir, containing a mass of crystal growth nutrient solution 17. Also shown are a spacer plate 18 and a cover plate 19.

Figure 2:
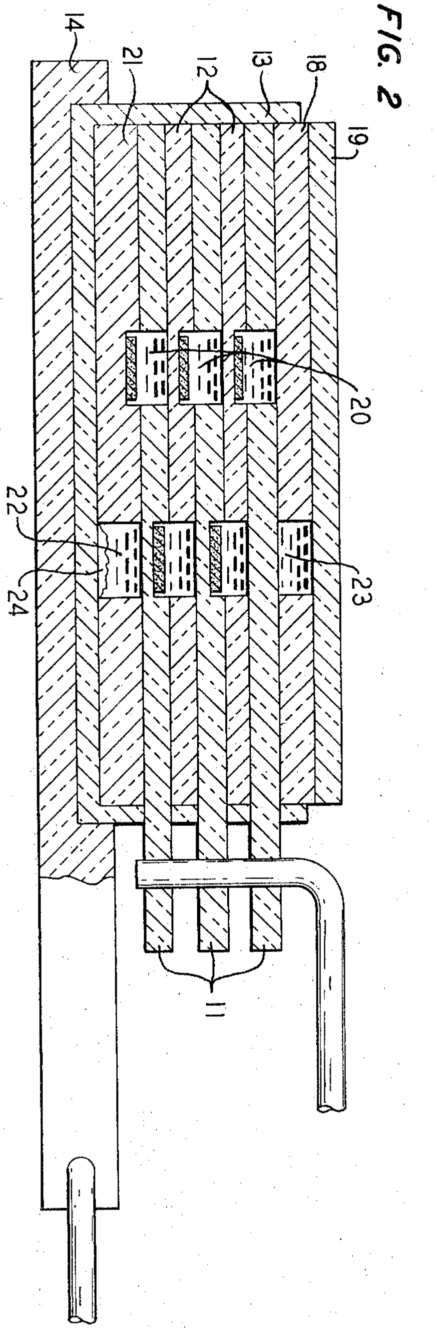
FIG. 2 is an elevational view in section of the apparatus of FIG. 1 showing the growth solution sectioned and brought into contact with the substrate wafers.

In operation the reservoir 17 is filled with the constituents of the growth solution. The apparatus 10 is then placed in a furnace and brought up to the desired temperature. After allowing sufficient time for the apparatus 10 to come to temperature and the nutrient solution 17 to equilibrate (become saturated with the semiconductor at that temperature), the carrier plates 11, 12 are displaced relative to one another in order to separate the solution into portions 20 and bring each portion into contact with one substrate wafer 15. The result of this displacement is illustrated in FIG. 2. The thickness of the carrier plates determines the thickness of the growth solution layer.

The spacer plate 18 and the lowest carrier plate 21 need not be of the thickness desired for defining the growth solution portions, since the solution portions 22, 23 confined by these two plates will not usually be used for epitaxial growth. These two solution portions may contain undissolved solid matter 24 which remains at the bottom of the solution reservoir or floats to the top during the equilibration step. When it is desired to discard the depleted growth solution after each growth cycle, the total volume of these two portions should not be greater than one half of the total volume of the solution mass 17. The inventive process is most advantageous from an economic point of view when at least five substrates are simultaneously processed.

The thickness of the solution portions from which epitaxial growth is to be accomplished is preferably between 0.1 millimeters and 3 millimeters. Solution layers less than 0.1 millimeters in thickness cannot contain enough solute to deposit epitaxial layers of thickness useful for most devices. Solution layers of the order of 1 millimeter thick can contain enough solute to deposit layers of sufficient thickness for most devices. Solution layers more than 3 millimeters in thickness can be uneconomically wasteful of materials, particularly in view of the decrease in deposition efficiency for thicker layers (U.S. Pat. No. 3,690,963, issued Sept. 12, 1972).

Epitaxial growth is terminated by removal of the solution layer from contact with the deposited crystal. This can be done by allowing the entire assembly to reach room temperature (or some elevated temperature at which the solution is essentially depleted but still liquid) before disassembling the carrier plates and washing the slices. Growth can also be terminated by removing the growth solution at some higher temperature by, for example, a further displacement of the carrier plates or an arrangement by which the solution will drain out upon a rotation of the assembly. Termination of growth at a temperature within 400 centigrade degrees of the temperature at which growth is initiated can be desirable, for example, to control the variation in the concentration of dopants from the initial portion to the final portion of the deposited layer. Such variations can arise, for example, through variation of the segregation coefficients of the various constituents with temperature or selective depletion of the nutrient solution as deposition progresses. An alternate method to achieve this control over dopant concentration is to allow growth to progress down to room temperature and remove a portion of the deposited layer by lapping or etching.

When growing epitaxial layers of Group III-V compound semiconductor materials the various parts of this apparatus can be constructed of refractory and non-contaminating materials such as graphite and fused silica. When fused silica is used in the construction of the carrier plates 11, 12 it has been found to be desirable to form a matte finish on the upper and lower surfaces of these plates by, for example, grinding the surface with a 600 grit polishing paper. This prevents effective wetting of the plate by the nutrient solution. The use of non-wetting plates permits more complete transport of the melt portions. The solution does not wet graphite. There is some evidence to indicate that graphite should not be used when oxygen doping is desired.

Materials

Liquid phase epitaxial (LPE) deposition of crystalline layers has been widely used in the growth of Group III-V compound semiconductors and their ternary combinations (i.e., such materials as GaP, GaAs, $GaAs_xP_{1-x}$ and $Ga_yAl_{1-y}As$). These materials find use, for example, in microwave devices and electroluminescent devices requiring either p-n junction wafers or wafers of only one conductivity type (e.g, Schottky barrier diodes). Such materials containing principally gallium phosphide, gallium arsenide and a combination of these two compounds have become especially important in the electroluminescent diode and laser diode field, materials of different composition emitting light of different wave length. These materials contain at least 80 weight percent GaP and/or GaAs and include such materials as GaAsP and GaAlAs. Minor dopants are usually included in the crystalline material in a quantity not exceeding one weight percent to modify and control such device parameters as conductivity type, conductivity and luminescent efficiency. Such species as S, Se, Te, Zn, Cd, Ge, Si, O and N have been used as dopants. Epitaxial deposition is usually carried out from a nutrient solution including a quantity of the Group III constituent as a solvent and the materials to be deposited as solutes, GaP and GaAs, for example, are deposited from gallium solution.

Exemplary Procedure

P-type and n-type layers of gallium phosphide have been deposited on gallium phosphide substrate wafers from solution portions typically 1 millimeter in thickness and in accordance with the above described method. In the exemplary apparatus used, the lowest carrier plate 21 was 2 millimeters thick and stationary. Alternate movable 11 and stationary 12 plates 1 millimeter in thickness were stacked so as to simultaneously grow 15 or more epitaxial layers on as many substrate wafers. The substrate wafers, approximately 3.5 centimeters in diameter, were placed in depressions approximately 0.4 millimeters deep, slightly greater than the thickness of each wafer.

Tellurium doped n-type layers were grown on n-type substrates in an apparatus in which the sliders were made of graphite. The apparatus loaded with wafers and nutrient solution constituents was placed in the furnace which idles at 500° C. Nitrogen gas was passed through the furnace at a rate of 1 liter per minute and the furnace heated at approximately 10° centigrade per minute to the starting growth temperature of 1,040° C. The apparatus was held at this temperature for 20 minutes, allowing for the solution of the solid constituents and equilibration of the melt. The flow of nitrogen gas was cut to approximately 100 cc per minute and maintained at this rate during the remainder of the growth cycle. After this equilibration time, the movable plates were pushed into the boat cleaving the melt into sections and placing each section on top of a substrate wafer. The furnace was cooled at approximately 0.75° centigrade per minute until a temperature of 850° C was reached. At that point the temperature was dropped at a rate of approximately 10° centigrade per minute to the furnace idling temperature, 500° C. The apparatus was removed from the furnace and, after cooling to room temperature, disassembled. Each slice was then placed into a cleaning solution where the depleted growth solution was wiped off with a cotton swab or soft bristle brush. The thickness of the epitaxial layer was reduced to approximately 40 micrometers by an ultrasonic etch in a 2.5 volume percent bromine in methanol solution.

In order to produce p-n junctions capable of emitting red-light, zinc-oxygen doped p-type gallium phosphide layers were grown on the n-type layers described above. This p-type growth was accomplished using fused silica sliders with surfaces ground with 600 grit paper. For p-type growth the apparatus was raised to 1,055° C and allowed to equilibrate for 20 minutes before the movable plates were slid relative to the stationary plates.

After the solution mass was sectioned and each solution portion brought into contact with the corresponding substrate wafer, the furnace temperature was increased by 8° centigrade to 1,063° C. This temperature was maintained for a 15 minute equilibration period to allow a controlled partial melt-back of the n-type layer. The furnace was then cooled to 600° C. The apparatus was held at this temperature for 5 hours and then for an additional 12 hours at 500° C (a standard annealing procedure for red emitting devices U.S. Pat. No. 3,703,671, issued Nov. 21, 1972). The apparatus was then removed from the furnace and the slices cleaned as above. It was found desirable to then remove approximately 25 micrometers of material prior to future processing of the slices into diodes. The above cited reference calls for annealing at temperature from 600° C to 400° C for times from 3 hours to 60 hours.

The n-type layers, as grown, were approximately 55 micrometers thick and the p-type layers as grown were approximately 80 micrometers thick. Slice to slice thickness variation was approximately ±8 micrometers with a flatness over each individual slice within ±5 micrometers. Maximum layer thickness (i.e., assuming 100 percent deposition efficiency) can be calculated from phase diagram of the major constituents (e.g., Thurmond, *Journal of the Physics and Chemistry of Solids*, 26 (1965) 785).

In order to reduce the possibility of having particles of undissolved gallium phosphide floating in the solution it was found desirable to include gallium phosphide as an initial constituent in two forms. Enough crushed polycrystalline gallium phosphide was included to slightly undersaturate the melt at the given starting temperature. To reach complete saturation of the melt a single crystal slice or chip was placed in the bottom well 22 of the melt chamber. For the growth of the p-type layer the following loading procedures were found to be preferred. First the single crystal chip or slice weighing at least 0.5 grams was placed on the bottom of the well 22. Next the powdered gallium oxide dopant was placed on the bottom of the well around the single crystal slice but not covering it. This was followed by the crushed polycrystalline gallium phosphide spread over the entire area followed by zinc pellets. Liquid gallium then filled the melt chamber 17 which was closed by a cover plate 19.

I claim:

1. A method for the simultaneous epitaxial growth of crystalline layers of Group III-V compound semiconductor on a plurality of crystalline substrate wafers from a plurality of solution portions comprising:

1. placing the wafers in an apparatus together with but out of contact with a body of constituents which, when heated, results in a solution mass of a nutrient solution,
2. raising the temperature of the apparatus to a first temperature at which the nutrient solution is saturated with the Group III-V compound semiconductor, Serial No. 370,947
3. separating each solution portion from the solution mass,
4. contacting each solution portion with a broad face of one substrate wafer,
5. constraining each solution portion in a direction perpendicular to the broad face to be less than 3 millimeters in thickness,
6. reducing the temperature of the solution portions and substrates in order to produce epitaxial growth and
7. terminating epitaxial growth characterized in that the solution portions are simultaneously separated from the solution mass, simultaneously brought into contact with the substrate wafers and simultaneously constrained in the growth direction, each operation being accomplished by displacing a first set of carrier plates relative to a second set of carrier plates which second set is interleaved with the first set and in that the solution portions include neither the uppermost nor the lowermost quantity of the solution mass.

2. A method of claim 1 in which the solution portions are isolated from one another prior to their being brought into contact with the substrate wafers.

3. A method of claim 1 in which the solution portions are constrained at the same time as they are brought into contact with the substrate wafers.

4. A method of claim 1 in which the solution portions, which are brought into contact with the substrate wafers, together constitute more than one half of the solution mass.

5. A method of claim 1 in which epitaxial growth is terminated at a second temperature within 400° centigrade of the first temperature by removing the solution portions from contact with the substrate wafers.

6. A method of claim 1 in which the plurality of substrate wafers is composed of at least five wafers.

7. A method of claim 1 in which the Group III-V compound semiconductor is at least 80 percent a member of the gallium phosphide-gallium arsenide family of materials.

8. A method of claim 7 in which the Group III-V compound semiconductor is at least 99 percent by weight GaP.

9. A method of claim 7 in which the solution contains at least one member selected from the group consisting of S, Se, Te, Zn, Cd, Ge, Si, O and N in such quantity as to form less than one percent by weight of the crystalline layers.

10. A method of claim 9 resulting in the deposition of a zinc and oxygen doped epitaxial layer on the substrate wafer.

11. A method of claim 10 in which the substrate wafer consists essentially of an n-type bulk grown portion and a tellurium doped epitaxial crystalline layer deposited from solution.

12. A method of claim 10 including heat treating the wafer at a temperature between 400° C and 600° C for times between 3 hours and 60 hours subsequent to the formation of the zinc and oxygen doped epitaxial layer.

13. A method of claim 12 including electrically contacting the n-type portion of the wafer and the zinc-oxygen doped epitaxial layer so as to form a diode capable of emitting red-light when suitably biased.

14. A method of claim 1 in which the body of constituents is the nutrient solution.

* * * * *

UNITED STATES PATENT AND TRADEMARK OFFICE

CERTIFICATE OF CORRECTION

PATENT NO. : 3,853,643

DATED : December 10, 1974

INVENTOR(S) : Hans Willem Verleur

It is certified that error appears in the above-identified patent and that said Letters Patent are hereby corrected as shown below:

Column 5, line 51, Claim 1, delete "Serial No. 370,947"

Signed and Sealed this

*ninth* Day of *December 1975*

[SEAL]

*Attest:*

RUTH C. MASON
*Attesting Officer*

C. MARSHALL DANN
*Commissioner of Patents and Trademarks*